Patented Mar. 1, 1949

2,463,078

UNITED STATES PATENT OFFICE 2,463,078

TREATMENT OF HYDROCARBONS

Glenn M. Webb, Riverside, Ill., assignor to Universal Oil Products Company, Chicago, Ill., a corporation of Delaware No Drawing. Application January 14, 1944, Serial No. 518,255

7 Claims. (Cl. 260—683.4)

This application is a continuation-in-part of my earlier application Serial No. 489,156, filed May 31, 1943. The invention relates to a process for treating synthetic hydrocarbons produced in the presence of active fluoride catalysts to remove the small amount of organically combined fluorine present therewith as an impurity. The invention is particularly adapted to the treatment of hydrocarbons produced by the alkylation of isoparaffins with olefins using active fluoride catalysts.

The alkylation of branched chain paraffins, such as isobutane, isopentane, etc. with olefins such as propylene, butylene, amylene, etc. to produce saturated liquid hydrocarbons, utilizable as components in motor fuels and particularly in aviation gasoline, has assumed commercial importance. Active fluoride catalysts, including hydrogen fluoride or hydrofluoric acid and mixtures of hydrogen fluoride and boron fluoride, are utilized in the alkylation of isoparaffins with olefins, but it has been found that the resultant alkylation product frequently contains minor quantities of fluorine in combination with the hydrocarbons, possibly due to the interaction of hydrogen fluoride with the olefinic constituents of the reaction mixture under the influence of the catalyst.

Although the fluorine content of the alkylate is rarely very high, its presence is undesirable. It has been found that the fluorine in alkylates is definitely objectionable because of its corrosive character, its tendency to readily react with various substances with which it comes into contact and to thereby form undesirable products which may result in plugging of pipe lines, and to its detrimental effect on the anti-knock properties of the gasoline.

Not only is the removal of fluorine from the hydrocarbon products important for the above reasons, but also the decomposition of the combined fluorine compounds is important because the combined fluorine represents a loss of hydrogen fluoride since it is no longer available for use as the catalyst. It is a particular feature of the present invention that the treating agent herein disclosed functions to release hydrogen fluoride by decomposing the combined fluorine compounds, and the released hydrogen fluoride may be recycled to the alkylation process for further use therein.

It is an object of the present invention to reduce the fluorine content of the hydrocarbon alkylation product to a point where the adverse effects are no longer substantial and to recover the hydrogen fluoride for further use in the alkylation process.

In a broad aspect the present invention relates to a process for purifying a hydrocarbon mixture synthesized in the presence of an active fluoride catalyst and containing as an impurity a relatively small amount of organically combined fluorine, which comprises treating said hydrocarbon mixture with aluminum metal.

In one specific embodiment the present invention relates to a process for purifying an alkylation product formed in the presence of hydrogen fluoride and containing a relatively small amount of organically combined fluorine as an impurity, which comprises treating said alkylation product with etched aluminum rings.

While the present invention is particularly adapted to the removal of fluorine from normally liquid hydrocarbon mixtures, it is also applicable to treatment of normally gaseous hydrocarbons containing fluorine compounds as impurities therein.

According to the present invention, the alkylation product is contacted with aluminum metal. For best results it is essential that certain factors in the use of the aluminum metal be given careful consideration. These factors include the porosity of the aluminum, its physical shape, the operating conditions under which the aluminum is employed, etc.

Experiments have shown that a highly porous aluminum metal gives greatly improved results. A particularly suitable method of treating aluminum shapes to produce a porous product is to subject the aluminum metal to an etching treatment and this may be accomplished by dipping in or otherwise suitably contacting the aluminum shapes with an acid such as muriatic acid, sulfuric acid, etc.

In the treatment of aluminum rings it has been found that a minimum of 6% of the total weight of the metal should be removed by the etching treatment since microscopic examinations have shown that etched rings in which less than 6% of the total metal has been removed are not as satisfactory as those in which a higher proportion of the metal has been so removed. As specific examples, muriatic acid of 2.4 to 0.6 normalcy may be employed at temperatures of 40 to 120° F. The aluminum rings may be contacted with the acid for a period ranging from 7 minutes to 12 hours. In many cases it is beneficial to precede the acid treatment with a caustic treatment in order to remove surface coatings from the aluminum prior to the etching treatment.

It is understood that other means of producing a suitable porous aluminum may be employed within the scope of the invention. One method may comprise amalgamating aluminum shapes with mercury followed by heating to a temperature of above about 850° F. to remove the mercury. Still another method may comprise pilling a mixture of fine aluminum granules or powder. It is understood that the aluminum shapes produced by these various methods are not necessarily equivalent in their dehydrofluorinating activity.

Another important feature to be considered is the physical shape of the aluminum. The aluminum should be in such shape that a large surface area is available for contact with the hydrocarbon mixture being treated. Aluminum rings are particularly preferred since they not only meet the requirement of large surface area, but also are desirable as a fractionating means to be hereinafter described in detail. Satisfactory rings are those having diameters of from ½" to 2", lengths of ½" to 2", and wall thickness of $\frac{1}{32}$" to ⅛". Particularly preferred are aluminum rings of 1" to 1½" diameter, 1" to 1½" length and $\frac{1}{16}$" wall thickness. Lessing rings of similar dimensions are also satisfactory. Aluminum rivets, aluminum turnings and aluminum granules have been used with satisfactory results. Another suitable treating agent may comprise carbon rings which have been sprayed with aluminum. It is understood that these aluminum shapes are preferably etched in the manner heretofore set forth.

It is also within the scope of the invention to use aluminum containing minor proportions of other metals. For example, aluminum-copper alloy rivets containing 2.2% copper have been subjected to an etching treatment in the manner heretofore set forth and were then utilized as a catalyst for dehydrofluorination. The alloy rivets were highly porous and gave very satisfactory results.

In the alkylation process, a hydrocarbon layer is separated from the catalyst layer and the hydrocarbon layer may then be fractionated to remove dissolved hydrogen fluoride. It is a particular feature of the present invention that the hydrocarbon layer may be subjected to said fractionation in the presence of the aluminum rings which may be disposed as a packing material in the fractionating zone. Thus the hydrogen fluoride produced by the decomposition of the organically combined fluorine compounds may be separated and recovered in commingled state with the hydrogen fluoride dissolved in the alkylation product. In such an operation, it is important that the shape of the aluminum metal be such that it serves as a fractionating means and thus may replace, in part or in whole, such contacting means as bubble trays or decks, baffle plates, side to side pans, etc. which normally are employed in conventional fractionation. The aluminum shape employed must be such that good vapor and liquid contact is accomplished and also that free flow of vapor and liquid is permitted.

It is important that the temperature and pressure for optimum dehydrofluorination be correlated with the temperature and pressure for optimum fractionation, so that both dehydrofluorination and fractionation are satisfactorily accomplished. The exact temperature, pressure and space velocity to be used will depend upon the particular method of operation employed. By space velocity, as used in the present specification and claims, is meant the hourly liquid space velocity, defined as the volume of hydrocarbon mixture charged per volume of aluminum in the treating zone per hour.

In one embodiment of the invention, the aluminum shapes may be disposed as packing material in a reaction zone and the hydrocarbon mixture passed therethrough under the desired temperature, pressure and space velocity. In this type of operation the temperature will usually be within the range of from about 150° to about 600° F. and preferably of from about 200 to about 300° F. The pressure however is preferably sufficient to maintain the hydrocarbon in substantially liquid phase and thus the pressure may range from about substantially atmospheric to 500 pounds or more.

In the preferred method of operation the aluminum rings are disposed as packing material in a fractionating column which is provided with means in the lower portion thereof for heating and with means provided in the upper portion thereof for cooling. The hydrocarbon mixture to be treated may be introduced to the upper portion of the treating zone to flow downwardly over the packing material, while contacting ascending vapors which have been formed by heating in the lower portion of the tower and by the heat exchange effected between the rising vapors and descending liquid at intermediate positions of the zone, thus continuously stripping hydrogen fluoride dissolved in the charge and formed by said decomposition and thereby separating the hydrogen fluoride from the hydrocarbons. This, in effect, comprises a plurality of vaporizing and condensing zones in the various sections of the dehydrofluorinating-fractionating zone.

In the preferred type of operation the temperature may be within the range heretofore set forth, but the pressure and space velocity must be correlated therewith in order to effect the desired fractionation. The exact conditions to be utilized will depend upon the character of the hydrocarbon material to be treated, the amount of dissolved hydrogen fluoride contained therein, the amount of combined fluorine compound, etc., but in any event mixed vapor and liquid phases must be present.

One important advantage to the use of aluminum as a dehydrofluorinating agent is that it decomposes the combined fluorine compounds and thus releases hydrogen fluoride which may be recycled to the alkylation zone for further use therein. This is advantageous over the heretofore suggested dehydrofluorinating agents which combined chemically with the fluorine in the formation of a complex compound or which physically retain the fluorine, in any event not releasing the hydrogen fluoride for reuse in the alkylation process. This highly important advantage in the decomposition of the organically combined fluorine compounds is particularly reflected in the preferred method of operation in which dehydrofluorinating and fractionating occur in the same zone, because the hydrogen fluoride produced by said decomposition is removed from the fractionating zone shortly after it is formed and thus the equilibrium of the reaction is shifted towards the production of additional hydrogen fluoride. In this way, better dehydrofluorination is obtained than otherwise is obtainable. This is extremely important from a commercial point of view since the removal of even minute amounts of fluorine compounds from aviation and motor gasoline is essential in order to avoid the corrosive action of the fluorine compounds.

The following examples are introduced for the purpose of further illustrating the novelty and utility of the present invention but not with the intention of unduly limiting the same.

Example I

Isobutane was alkylated by butenes in the presence of hydrogen fluoride catalyst at a temperature of 100° F. A hydrocarbon layer was separated from the catalyst layer and the hydrocarbon layer was then introduced into a stripping zone. The stripping zone comprised a vessel 7' long by 3" wide and was equipped with an internal closed coil in the lower portion thereof. A heating medium was introduced through the closed coil in order to maintain a temperature of about 205° F. in the lower portion of the stripping zone. The upper portion of the stripping zone was maintained at a temperature of about 120° F. The stripping zone was operated at a pressure of about 175 pounds per square inch. A bed 4' 7" high of aluminum turnings of greater than 10 mesh was disposed in the stripping zone and was supported therein 12 inches from the bottom by means of a perforated plate.

The hydrocarbon layer was passed downwardly through the stripping zone. The hydrogen fluoride liberated therein was removed from the upper portion of the stripping zone while the liquid hydrocarbons were removed from the lower portion thereof and were supplied to a stabilizing column.

The alkylate prior to introduction to the stripping zone had a fluorine content of about .01, while the fluorine content of the final alkylate as withdrawn from the lower portion of the stabilizing column had a fluorine content of about 0.0001.

Example II

A normal butane fraction containing 4.4% by weight of butyl fluoride was contacted with granular aluminum at a temperature of 240° F. under substantially atmospheric pressure. The product contained 0.064%, thus showing a reduction of 99% in a single pass.

Example III

Another butane fraction containing 0.072% by weight of butyl fluoride was contacted with granular aluminum at a temperature of 247° F. under atmospheric pressure. The fluorine content was reduced to 0, thus showing a 100% reduction in the fluorine content in a single pass.

Example IV

A synthetic mixture of normal butane and butyl fluoride containing 2000 parts per million of fluorine as determined by combustion and titration analysis was prepared. One portion of the synthetic mixture was contacted with aluminum rivets and another portion of the synthetic mixture was contacted with aluminum rivets which had been previously etched by first pretreating 25 grams thereof with 4% potassium hydroxide for six minutes to remove surface coating and then by pickling in 180 cc. of hydrochloric acid until exhaustion of the acid. These tests were conducted at a temperature of 240° F. and a pressure of 330 pounds per square inch.

In the case of the aluminum rivets which had not been previously etched, the amount of dehydrofluorination reached a maximum of only 30% after five hours in service and then decreased, whereas with the etched aluminum rivets, the amount of dehydrofluorination was as high as 60% after six hours of treatment and increased to 61% after seven hours.

The tests in this example were conducted by passing the charge through the treating agent under liquid phase conditions without simultaneous fractionation and therefore are not comparable with the results reported in the other examples, since the latter were obtained from experiments employing concurrent dehydrofluorination and fractionation. A comparison of the results in this example with the results in the other examples further illustrates the advantages of the preferred dehydrofluorinating-fractionating type of operation.

Example V

The following experiments were conducted with an alkylation product containing 0.02 to 0.04% by weight of combined fluorine. The aluminum used was in the form of turnings, aluminum rivets and aluminum sprayed carbon rings. For comparative purposes, experimental results on carbon rings are also included. The temperatures employed and the results obtained are shown in the following table.

| Dehydrofluorinating agent | Aluminum turnings | | Etched Aluminum Rivets | Aluminum sprayed carbon rings | Carbon rings | |
|---|---|---|---|---|---|---|
| Treating zone bottom temperature | 200 | 240 | 200 | 200 | 200 | 240 |
| Space velocity | 2 | 2 | 6 | 2 | 2 | 2 |
| Per cent dehydrofluorination | 69 | 80 | 95 | 100 | 40 | 40 |

It is to be noted that the results with the etched aluminum rivets are much better in this example than for the same treating agent in Example IV. The reason for this, as hereinbefore set forth, is that the tests in this example were conducted in concurrent dehydrofluorinating and fractionating apparatus, whereas the experiments reported in Example IV were conducted without simultaneous fractionation.

In comparing the results obtained with the etched aluminum rivets and those obtained with the other treating agents, the difference in space velocities must be considered. It is noted that the experiments with the etched rivets were conducted at a space velocity of 6 as compared to a space velocity of 2 in the other tests.

I claim:

1. In the catalytic alkylation of hydrocarbons in the presence of hydrogen fluoride, wherein there is formed a hydrocarbon fraction containing a relatively small amount of an organic fluorine compound, the method which comprises contacting the hydrocarbon fraction with metallic aluminum to liberate hydrogen fluoride from said compound, separating thus liberated hydrogen fluoride from the hydrocarbon fraction and returning the same to the alkylation step.

2. In the catalytic alkylation of hydrocarbons in the presence of hydrogen fluoride, wherein there is formed a hydrocarbon liquid containing dissolved hydrogen fluoride and an organic fluorine compound, the method which comprises separating dissolved hydrogen fluoride from the hydrocarbon liquid by fractionating the latter in the presence of metallic aluminum whereby to liberate additional hydrogen fluoride from said organic compound, recovering said additional hydrogen fluoride together with said dissolved hydrogen fluoride separated by the fractionation, and returning the separated hydrogen fluoride to the alkylation step.

3. The method as defined in claim 2 further characterized in that said aluminum has been made porous by etching.

4. The process as defined in claim 1 further characterized in that said aluminum has been made porous by etching.

5. The process as defined in claim 1 further characterized in that said aluminum is alloyed with copper.

6. In the catalytic alkylation of hydrocarbons in the presence of hydrogen fluoride, wherein there is formed a hydrocarbon fraction containing a relatively small amount of an organic fluorine compound, the method which comprises contacting the hydrocarbon fraction with metallic aluminum to liberate hydrogen fluoride from said compound, and separating the thus liberated hydrogen fluoride from said hydrocarbon fraction.

7. In the catalytic alkylation of hydrocarbons in the presence of hydrogen fluoride, wherein there is formed a hydrocarbon liquid containing dissolved hydrogen fluoride and an organic fluorine compound, the method which comprises separating dissolved hydrogen fluoride from the hydrocarbon liquid by fractionating the latter in the presence of metallic aluminum whereby to liberate additional hydrogen fluoride from said organic compound, and separating said additional hydrogen fluoride together with said dissolved hydrogen fluoride from said hydrocarbon liquid.

GLENN M. WEBB.

REFERENCES CITED

The following references are of record in the file of this patent:

UNITED STATES PATENTS

| Number | Name | Date |
| --- | --- | --- |
| 1,801,213 | Teplitz | Apr. 14, 1931 |
| 1,869,781 | Shiffler et al. | Aug. 2, 1932 |
| 2,205,411 | Howard | June 25, 1940 |
| 2,347,945 | Frey | May 2, 1944 |